United States Patent
Hughes

(10) Patent No.: US 11,455,704 B2
(45) Date of Patent: Sep. 27, 2022

(54) APPARATUS AND METHOD

(71) Applicant: Sony Interactive Entertainment Inc., Tokyo (JP)

(72) Inventor: Colin Jonathan Hughes, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/194,441

(22) Filed: Mar. 8, 2021

(65) Prior Publication Data
US 2021/0287326 A1 Sep. 16, 2021

(30) Foreign Application Priority Data

Mar. 11, 2020 (GB) .................................. 2003526

(51) Int. Cl.
*G06T 1/20* (2006.01)
*G06T 11/00* (2006.01)

(52) U.S. Cl.
CPC ............... *G06T 1/20* (2013.01); *G06T 11/00* (2013.01)

(58) Field of Classification Search
CPC ....... G06T 1/20; G06T 11/00; G06T 2210/08; G06T 15/005
See application file for complete search history.

(56) References Cited

U.S. PATENT DOCUMENTS

| 6,064,393 A | 5/2000 | Lengyel |
| 6,072,498 A * | 6/2000 | Brittain ................... G06T 15/00 345/428 |
| 2010/0060629 A1 | 3/2010 | Rasmusson |
| 2020/0043223 A1 * | 2/2020 | Leiby ....................... G06F 3/011 |
| 2021/0256753 A1 * | 8/2021 | Wang ..................... G06T 15/005 |

FOREIGN PATENT DOCUMENTS

WO 2019032192 A1 2/2019

OTHER PUBLICATIONS

Li et al., Time-Critical Multiresolution Volume Rendering using 3D Texture Mapping Hardware, 0-7803-7641-2/02, 2002 © IEEE, pp. 29-36 (Year: 2002).*
European Search Report for corresponding EP Application No. 21161332.8, 7 pages, dated Jul. 13, 2021.
Combined Search and Examination Report for corresponding GB Application No. 2003526.7, 9 pages, dated Oct. 6, 2020.

* cited by examiner

*Primary Examiner* — Samantha (Yuehan) Wang
(74) *Attorney, Agent, or Firm* — Matthew B. Dernier, Esq.

(57) ABSTRACT

A data processing apparatus includes rendering circuitry to render an image frame by plural successive rendering stages, each rendering stage having a respective initial rendering stage time allocation, prediction circuitry to predict, in dependence upon rendering of at least one rendering stage of the plural successive rendering stages of a given image frame by the rendering circuitry, whether a total time period for rendering the given image frame by the rendering circuitry will exceed an associated image frame rendering time allocation for the given image frame, and allocation circuitry to vary the respective initial rendering stage time allocation for one or more rendering stages which are not yet completed in respect of the given image frame responsive to the prediction circuitry, so as to shorten the total time period for rendering the given image frame by the rendering circuitry.

19 Claims, 6 Drawing Sheets

APPARATUS AND METHOD

FIELD OF THE DISCLOSURE

The present disclosure relates to apparatus and methods.

BACKGROUND

The speed and realism with which a scene can be rendered is a key consideration in the field of computer graphics processing. Rendering operations are performed by rendering circuitry (GPU and/or CPU) as part of an execution of an application such as a computer game to render an image frame. Rendering operations typically comprise processing of model data or other predefined graphical data to render data for display as an image frame.

A rendering process performed for a given image frame thus comprises a plurality of successive rendering stages (also known as rendering phases), where each rendering stage is performed so as to obtain a different rendering effect for the rendered image frame. Examples of successive rendering stages to be performed for a scene in an image frame include stages of: rendering an environment map; rendering a shadow map; rendering opaque geometries; rendering transparent geometries; rendering deferred lighting; rendering depth-of-field effects; anti-aliasing; rendering ambient occlusions; and scaling. Techniques for performing respective rendering stages to achieve different rendering effects for an image frame are discussed in Scherzer et al., Temporal Coherence Methods in Real-Time Rendering, Computer Graphics Forum, Vol. 31 (2012), Number 8, pages 2378-2408. The contents of this disclosure are incorporated by reference into this description in their entirety.

In order to render a sequence of image frames representing a scene in real time, each image frame is allocated a period of time within which to render the image frame. For example, when implementing a frame rate of 60 Hz, each image frame is allocated a maximum time period of $\frac{1}{60}$=16.6 milliseconds within which the image frame is to be rendered. The rendering circuitry is therefore required to complete the rendering process for the image frame within the allocated time period, in which the rendering process comprises the plurality of successive rendering stages which each have to be completed within the allocated time period.

Applications such as computer games often require rendering of high quality image frames in accordance with a target frame rate. However, during the rendering process for a given image frame, variations in the properties of a scene to be rendered can cause changes in the amount of time required for completing the plurality of successive rendering stages. For example, complexities associated with rendering a scene may result in the stage of rendering a shadow map for the scene requiring more time than expected.

As a consequence of such an increase in the time taken for completing the plurality of successive rendering stages, and in order to provide a frame for display at the intended display time so as to avoid a reduction in the display frame rate, the image frame may have to be rendered for display without some of the rendering effects having been applied. Alternatively, some systems may (at least temporarily) adopt a lower frame rate so as to allow the rendering process to be completed before displaying the image frame.

Problems associated with rendering image frames according to time constraints are considered.

It is in this context that the present invention arises.

SUMMARY

An example embodiment provides a data processing apparatus comprising:

rendering circuitry to render an image frame by plural successive rendering stages, each rendering stage having a respective initial rendering stage time allocation;

prediction circuitry to predict, in dependence upon rendering of at least one rendering stage of the plural successive rendering stages of a given image frame by the rendering circuitry, whether a total time period for rendering the given image frame by the rendering circuitry will exceed an associated image frame rendering time allocation for the given image frame; and allocation circuitry to vary the respective initial rendering stage time allocation for one or more rendering stages which are not yet completed in respect of the given image frame responsive to the prediction circuitry, so as to shorten the total time period for rendering the given image frame by the rendering circuitry.

Another example embodiment provides a data processing method comprising:

rendering an image frame by plural successive rendering stages, each rendering stage having a respective initial rendering stage time allocation;

predicting, in dependence upon rendering of at least one rendering stage of the plural successive rendering stages of a given image frame, whether a total time period for rendering the given image frame will exceed an associated image frame rendering time allocation for the given image frame; and varying the respective initial rendering stage time allocation for one or more rendering stages which are not yet completed in respect of the given image frame responsive to the prediction, so as to shorten the total time period for rendering the given image frame.

Example embodiments provide computer software which, when executed by a computer, causes the computer to perform the steps of the method defined above.

Example embodiments provide a machine-readable, non-transitory storage medium which stores such computer software.

Various other aspects and features of the present disclosure are defined in the appended claims.

BRIEF DESCRIPTION OF THE DRAWINGS

The present technique will be described further, by way of example only, with reference to embodiments thereof as illustrated in the accompanying drawings, in which.

DESCRIPTION OF THE EMBODIMENTS

Figure 1:
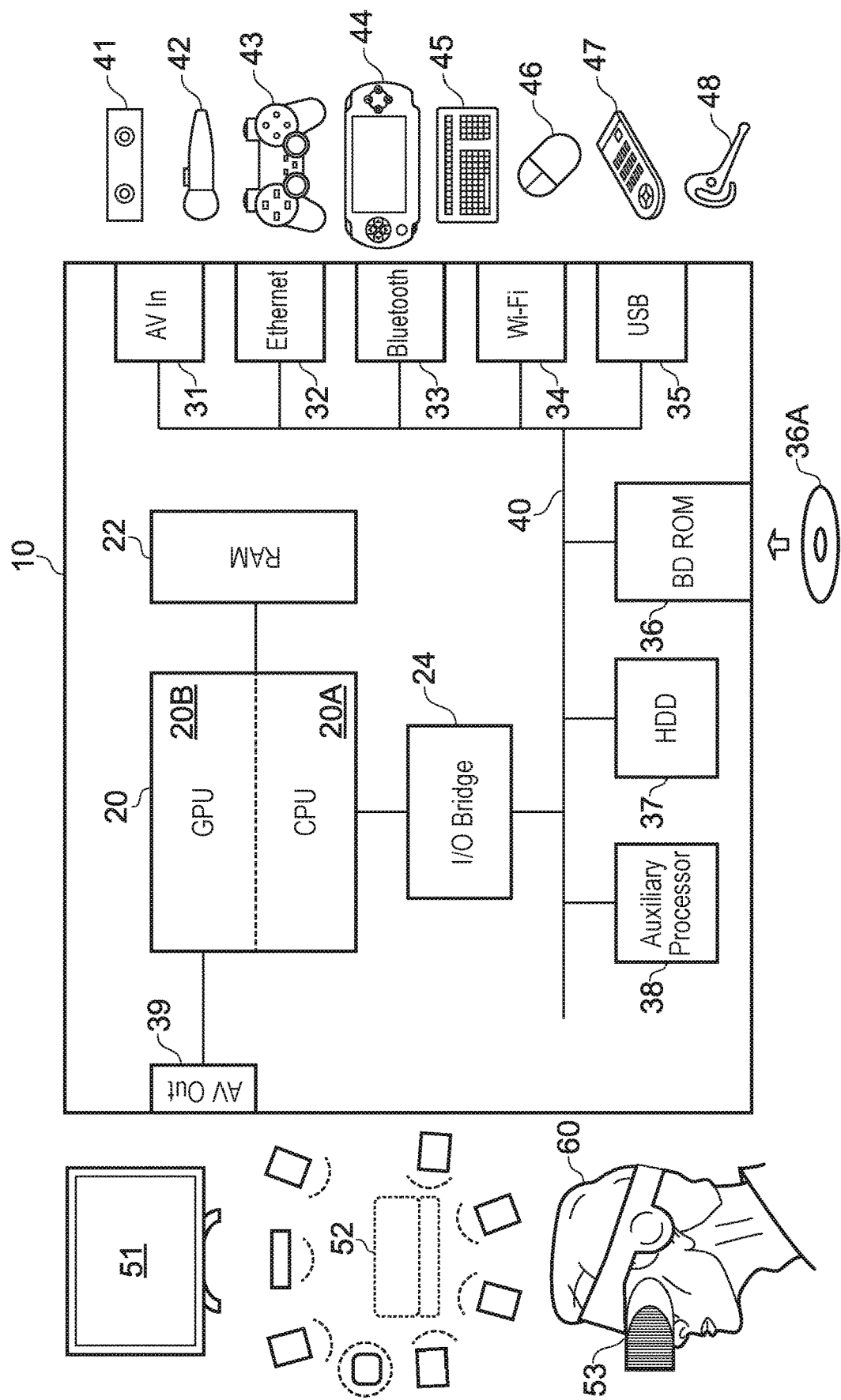
FIG. 1 is a schematic diagram illustrating a computer game processing apparatus.

FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images (image data) and audio for output via the AV output 39. Optionally the audio may be generated in conjunction with or instead by an audio processor (not shown). The video images are generated by a rendering process, for example in response to game events, operations or scenarios of a computer game executed by the CPU 20A, for example under the control of user inputs provided by the one or more peripheral devices.

The video and optionally the audio may be presented to a television 51. Where this feature is supported by the television, the video may be stereoscopic. The audio may be presented to a home cinema system 52 in one of a number of formats such as stereo, 5.1 surround sound or 7.1 surround sound. Video and audio may likewise be presented (as well or instead) to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a computer game processing apparatus having rendering circuitry to render an image frame, the rendering circuitry comprising at least one of the CPU 20A and the GPU 20B.

Figure 2A:
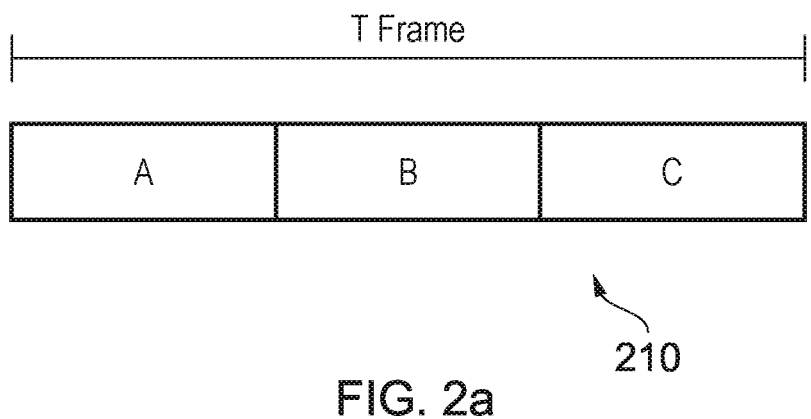
FIG. 2a is a schematic diagram illustrating an example of plurality of successive rendering stages for an image frame.

FIG. 2a schematically illustrates an example timing diagram (in which time progresses from left to right as drawn) of a plurality of successive rendering stages for rendering an image frame. In the example shown, the image frame 210 has a time allocation TFrame which represents a period of time within which the successive rendering stages A, B and C are to be completed in order to render the image frame 210. For example, for a system implementing in real time a frame rate of N image frames per second, the time allocation TFrame for each image frame is no more than 1/N seconds. Therefore, for a system implementing a fixed frame rate of 120 Hz, the time allocation TFrame for each image frame may be $\frac{1}{120}$ second, or (to one decimal place) 8.3 milliseconds.

In some examples, a system may implement a variable frame rate in which the time allocation TFrame may vary from one frame to another. Nevertheless, assuming that a period TFrame has been allocated to a given frame to be rendered in real time, it is a requirement that those rendering processes which are performed are able to be completed by the end of that rendering period TFrame.

In the example shown in FIG. 2a, the rendering process for the image frame 210 comprises three respective rendering stages; however, it will be appreciated the rendering process for the image frame 210 may comprise a greater or lesser plurality of successive rendering stages which are to be performed successively and completed (individually and as a group) within the time allocation TFrame for the image frame. In the example shown in FIG. 2a, each of the rendering stages A, B and C is completed so that the overall succession of stages completes within the time allocation TFrame, and therefore the image frame is rendered in real time by the plural successive rendering stages at an appropriate image display time. FIG. 2a therefore provides an example of a situation in which the plural successive rendering stages are completed within the time allocation TFrame.

Figure 2B:
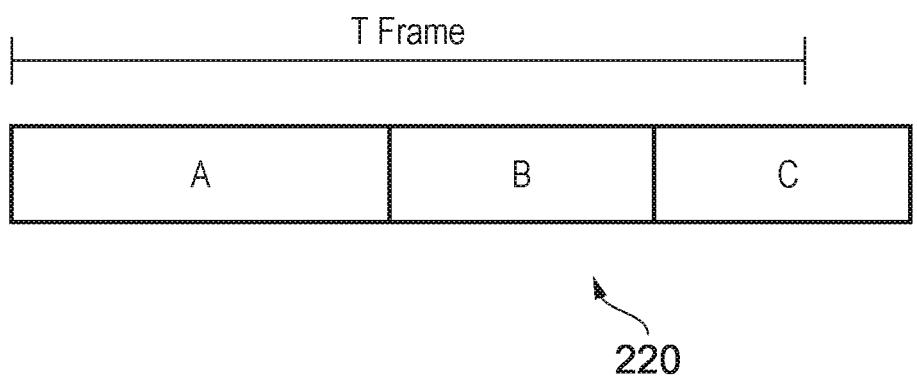
FIG. 2b is a schematic diagram illustrating a plurality of successive rendering stages for rendering an image frame in which one of the rendering stages has overrun its timing allocation.

FIG. 2b schematically illustrates an example of the plurality of successive rendering stages for rendering an image frame 220, in which the time taken for performing the rendering stage A has taken longer than an initial time that is expected or pre-allocated for the rendering stage A. A visual comparison of the length of time taken to perform the rendering stage A in FIG. 2a with the length of time taken to perform the rendering stage A in FIG. 2b shows that the time taken to perform the rendering stage A is longer in FIG. 2b (as mentioned, time is represented in the horizontal axis from left to right in FIGS. 2a and 2b). In other words, the rendering stage A in FIG. 2b has continued to run for longer than the expected period of time and is said to have overrun its timing allocation. In this case, the additional time required for the rendering of rendering stage A in FIG. 2b causes a delay for the start time of the successive rendering stages B and C. In this example, the delay caused by the rendering of the rendering stage A means that it is not possible for the rendering stage C to be completed within the time allocation TFrame for the image frame 220. It will be appreciated that in the example shown it is not possible to complete the rendering stage C, however, in some cases the additional amount of time required to complete one or more of the rendering stages may mean that there are a plurality of rendering stages which are not completed within the time allocation TFrame. As explained previously, this is problematic in that it is not possible to complete the plurality of rendering stages within the time allocation TFrame and as a consequence the image frame is rendered by: omitting the rendering stage C; waiting until the rendering stage C is completed which causes a drop in the frame rate at least temporarily; or rendering the image frame with the rendering stage C having been partially completed for the image frame. In the case where the image frame is rendered with the rendering stage C having been partially completed, depending on the type of rendering operation associated with the rendering stage, the rendering stage C may be partially completed for an image frame either in that the rendering operation has been partially performed for each pixel of the image frame or in that the rendering operation has been completely performed but for only a portion of the pixels of the image frame. In some examples, the rendering stage C may be completed for only a portion of the image frame in that the rendering operation has been completed for some of the graphical objects to be represented in the image frame. It is therefore desirable to improve allocation of resources for rendering image frames.

Figure 3:
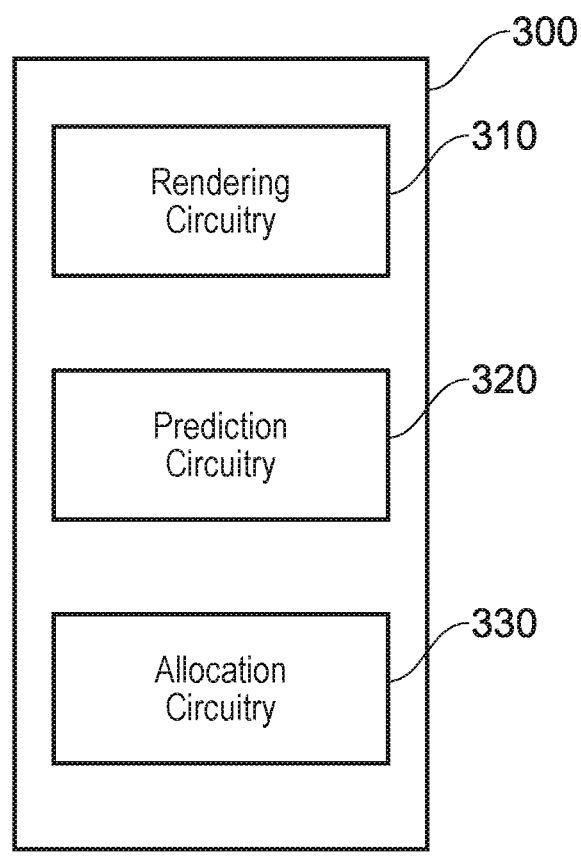
FIG. 3 is a schematic diagram illustrating a data processing apparatus.

FIG. 3 schematically illustrates a data processing apparatus 300 for rendering a given image frame in real time responsive to a prediction for the given image frame, where the prediction is dependent upon rendering of at least one rendering stage of the plural successive rendering stages of the given image frame. In embodiments of the disclosure, the data processing apparatus 300 comprises: rendering circuitry 310 to render an image frame by plural successive rendering stages, each rendering stage having a respective initial rendering stage time allocation; prediction circuitry 320 to predict, in dependence upon rendering of at least one rendering stage of the plural successive rendering stages of a given image frame by the rendering circuitry, whether a total time period for rendering the given image frame by the rendering circuitry will exceed an associated image frame rendering time allocation TFrame for the given image frame; and allocation circuitry 330 to vary the respective initial rendering stage time allocation for one or more rendering stages which are not yet completed in respect of the given image frame responsive to the prediction circuitry 320, so as to shorten the total time period for rendering the given image frame by the rendering circuitry 310.

In this context, the data processing apparatus 300 may be provided as part of a computer game processing apparatus, such as that illustrated in FIG. 1, or a general purpose computing device. The rendering circuitry 310 of the data processing apparatus 300 is configured to render an image frame in real time and may comprise at least one of the CPU 20A and the GPU 20B. The rendering circuitry 310 is configured to render an image frame such as the image frame 200 illustrated in FIG. 2a by the plurality of successive rendering stages.

The prediction circuitry 320 is configured to predict whether a total time period for rendering a given image frame by the rendering circuitry 310 will exceed the time allocation TFrame for the given image frame. The prediction circuitry 320 is configured to generate the prediction in dependence upon a property associated with the rendering by the rendering circuitry 310 of at least one of the rendering stages for the given image frame. In this way, the prediction circuitry 320 can predict, while the rendering circuitry 310 is performing the rendering process comprising the plurality of successive rendering stages for the given image frame, whether the plurality of successive rendering stages for the given image frame will be completed within the time allocation TFrame for the given image frame. In response to a prediction by the prediction circuitry 320 that the total time period for rendering the given image frame by the rendering circuitry 310 will exceed the time allocation TFrame for the given image frame, the allocation circuitry 330 is configured to vary an initial rendering stage time allocation for one or more of the rendering stages which are yet to be completed by the rendering circuitry 310 for the given image frame, so as to shorten the one or more initial rendering stage time allocations and thereby inhibit the total time period for rendering the given image frame by the rendering circuitry 310 from exceeding the time allocation TFrame associated with the given image.

Figure 4A:
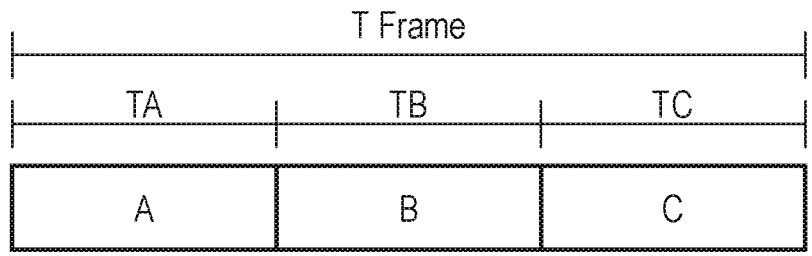
FIG. 4a is a schematic diagram illustrating an initial rendering stage time allocation for a plurality of rendering stages.

Referring now to FIG. 4a, a schematic diagram (of a similar format to FIGS. 2a and 2b) is shown illustrating a plurality of successive rendering stages (A, B and C in this example) for rendering an image frame 400, in which each rendering stage has a respective initial rendering stage time allocation. In the example shown: the rendering stage A has an initial rendering stage time allocation TA; the rendering stage B has an initial rendering stage time allocation TB; and the rendering stage C has an initial rendering stage time allocation TC. Each of the rendering stages A, B and C is rendered successively by the rendering circuitry 310 so as to obtain a different rendering contribution or effect for the image frame 400, and as such each rendering stage is associated with a different type of rendering operation. Types of rendering operation may include: environment map operations; shadow map operations; opaque geometry operations; transparent geometry operations; deferred lighting operations; depth-of-field operations; anti-aliasing operations; ambient occlusion operations; and scaling operations among others.

In embodiments of the disclosure, the respective initial rendering stage time allocation is set in advance for each rendering stage for the given image frame 400 in dependence upon a type of rendering operation associated with the rendering stage. In this case, the initial rendering stage time allocation is set according to a type of rendering operation, and a different initial rendering stage time allocation may be initially set for different types of rendering operations. A first initial rendering stage time allocation may be set in advance for a rendering stage associated with a first type of rendering operation and a second initial rendering stage time allocation may be set in advance for a rendering stage associated with a second type of rendering operation, where the first type of rendering operation is different from the second type of rendering operation. Therefore, rather than the allocation circuitry 330 allocating a respective initial rendering stage time allocation for each rendering stage for the given image frame 400, a respective initial rendering stage time allocation may be set in advance, and therefore the allocation circuitry 330 is configured to vary the respective initial rendering stage time allocation set in advance for one or more rendering stages responsive to the prediction circuitry 320. For example, the rendering circuitry 310 may receive data indicative of the plural successive rendering stages to be rendered for an image frame, where the data indicates the initial rendering stage time allocation set for each of the plural successive rendering stages. The allocation circuitry 330 is thus configured to vary a respective initial rendering stage time allocation set in advance either by allocating a second rendering stage time allocation responsive to the prediction circuitry 320 to replace the initial rendering stage time allocation set in advance, or by allocating a second rendering stage time allocation responsive to the prediction circuitry 320 to adjust (modify) the initial rendering stage time allocation set in advance.

In embodiments of the disclosure, the allocation circuitry 330 is configured to allocate, prior to rendering of a given image frame 400 by the rendering circuitry 310, the respective initial rendering stage time allocation for each rendering stage for the given image frame 400 in dependence upon at least a type of rendering operation associated with the rendering stage. Rather than the respective initial rendering stage time allocation being set in advance for each rendering stage for the given image frame 400, the allocation circuitry 330 is configured to allocate the respective initial rendering stage time allocation for each rendering stage for the given image frame 400, and the allocation circuitry 330 is configured to allocate another respective initial rendering stage time allocation responsive to the prediction circuitry 320 to vary the respective initial rendering stage time allocation for one or more rendering stages not yet completed by the rendering circuitry 310. The allocation circuitry 330 is thus configured to vary a respective initial rendering stage time allocation either by allocating another respective initial rendering stage time allocation responsive to the prediction circuitry 320 to replace the respective initial rendering stage time allocation that was previously allocated by the allocation circuitry 330 in advance of rendering of the given image frame 400 by the rendering circuitry 310, or by allocating another respective initial rendering stage time allocation responsive to the prediction circuitry 320 to adjust (modify) the respective initial rendering stage time allocation that was previously allocated by the allocation circuitry 330.

Therefore, each rendering stage of the plurality of successive rendering stages for an image frame has an initial rendering stage time allocation which is either set in advance or initially allocated by the allocation circuitry 330, and references herein to an initial rendering stage time allocation refer to an initial rendering stage time allocation that may be either set in advance or initially allocated by the allocation circuitry 330.

In some examples, certain types of rendering operations may have a substantially equal initial rendering stage time allocation. However, some types of rendering operations may be considered as being of greater importance, or may require more complex operations, than other types of rendering operations and thus rendering stages associated with different types of rendering operations may have a different initial rendering stage time allocation. For example, for the image frame 400, an initial rendering stage time allocation TA of X milliseconds may be initially set or initially allocated for rendering stage A, an initial rendering stage time allocation TB of Y milliseconds may be initially set or initially allocated for rendering stage B, and an initial rendering stage time allocation TC of Z milliseconds may be initially set or initially allocated for rendering stage C, where the values X, Y and Z may be the same or may be different depending on the types of rendering operations. For an image frame rendering time allocation TFrame for the image frame 400 of 15 milliseconds, for example, each of the respective initial rendering stage time allocations TA, TB and TC may be set in advance to 5 milliseconds in dependence upon the type of rendering operations associated with A, B and C. In this example, the rendering operations associated with A, B and C are each associated with substantially equal time allocations. Alternatively, each of the respective initial rendering stage time allocations TA, TB and TC may be set in advance in dependence upon the type of rendering operations associated with A, B and C such that the initial rendering stage time allocations TA, TB and TC may be different from each other. For example, values of 7 milliseconds, 5 milliseconds and 3 milliseconds may be set for the initial rendering stage time allocations TA, TB and TC, respectively. In the examples shown in FIGS. 4a-4c, the initial rendering stage time allocation is the same for each of the rendering stages A, B and C for simplicity of explanation.

Figure 4B:
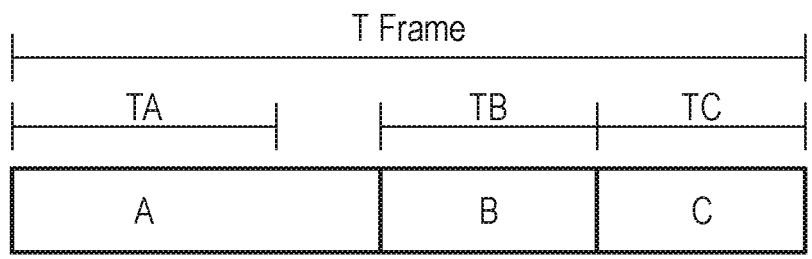
FIG. 4b is a schematic diagram illustrating varying the initial rendering stage time allocation in response to a prediction.

Referring now to FIG. 4b, a schematic diagram is shown illustrating a plurality of successive rendering stages (A, B and C in this example) for rendering the image frame 400, in which the rendering of the rendering stage A by the rendering circuitry 310 overruns the initial rendering stage time allocation TA. In the following, the term overrun refers to a situation in which a total time period required for rendering a rendering stage by the rendering circuitry 310 exceeds the initial time allocation for that rendering stage. As illustrated previously with respect to FIG. 2a, in the case of such an overrun of one of the rendering stages, a problem would arise in that the rendering of rendering stage C is not completed within the time allocation TFrame for the image frame 200. However, as shown now with respect to FIG. 4b, in embodiments of the disclosure the prediction circuitry 320 is configured to predict, in dependence upon the rendering by the rendering circuitry 310 of at least one rendering stage of the plural successive rendering stages of the image frame 400, whether a total time period for rendering the image frame 400 by the rendering circuitry 310 will exceed an associated image frame rendering time allocation TFrame for the image frame 400. The prediction circuitry 320 is configured to generate the prediction at any time during the rendering of the image frame 400 by the rendering circuitry 310, and the allocation circuitry 330 is configured to vary the initial rendering stage time allocations for one or more of the rendering stages which are not yet completed for the image frame 400 so that the total time period for rendering the image frame 400 by the rendering circuitry 400 is shortened.

In embodiments of the disclosure, the prediction circuitry 320 is configured to predict whether the total time period for rendering the given image frame 400 by the rendering circuitry 310 will exceed the associated image frame rendering time allocation for the given image frame 400 in dependence upon a prediction of whether the rendering of at least one rendering stage of the plural successive rendering stages of the given image frame 400 by the rendering circuitry 310 will exceed the initial rendering stage time allocation for the rendering stage. The prediction circuitry 320 can be configured to generate the prediction for the image frame 400 during the rendering of the image frame 400 by the rendering circuitry 310, by predicting whether at least one of the rendering stages A, B, C for the image frame 400 will exceed the initial rendering stage time allocation TA, TB, TC, respectively. For example, the prediction circuitry 320 can be configured to predict whether the total time period for rendering the given image frame 400 by the rendering circuitry 310 will exceed the associated image frame rendering time allocation for the given image frame 400 by predicting, during the rendering of the rendering stage A by the rendering circuitry 310 (before completion of the rendering stage A by the rendering circuitry 310), whether the rendering stage A will exceed the initial rendering stage time allocation TA for the rendering stage A. In the case of predicting that the initial rendering stage time allocation TA will be exceeded by the rendering stage A, the prediction circuitry 320 predicts that the total time period for rendering the image frame 400 by the rendering circuitry 310 will exceed the associated image frame rendering time allocation TFrame for the image frame 400. Whether the rendering of the rendering stage A will exceed the initial rendering stage time allocation TA can be predicted during the rendering of the rendering stage A by the rendering circuitry 310 and therefore prior to the completion of the rendering stage A by the rendering circuitry 310. This may be achieved by detecting a portion of the rendering stage that has been completed and a portion of the initial rendering stage time allocation spent. In other words, an extent to which the rendering stage A has been completed (e.g. 50%) can be detected and the amount of the initial rendering stage time allocation TA that has been spent (e.g. 90%) can also be detected, and on this basis a prediction as to whether the rendering by the rendering circuitry 310 of the rendering stage A will exceed the initial rendering stage time allocation TA can be generated. For example, a detection of a number of pixels for which rendering operations have been performed out of a total number of pixels for the image frame may be used to indicate the extent to which a given rendering stage has been completed by the rendering circuitry 310. Polygonal meshes having vertices, edges and faces forming a group of polygons (primitives) connected by shared vertices may typically be used in rendering operations for surfaces of graphical objects to be represented in the image frame. In some examples, a detection of a number of primitives that have been processed out of a total number of primitives for the image frame may be used to indicate the extent to which a given rendering stage has been completed by the rendering circuitry 310. Optionally, a combination of a detection of a number of processed pixels for an image frame and a number of processed primitives for the image frame may be used to indicate a level of completeness of a given rendering stage. Therefore, in the example above where the rendering stage A is indicated to be 50% complete and 90% of the initial rendering stage time allocation TA has been spent, the prediction circuitry 320 will predict that the total time period for rendering the given image frame 400 by the rendering circuitry will exceed the associated image frame rendering time allocation TFrame for the given image frame 400. Therefore, the allocation circuitry 330 can vary the initial respective rendering stage time allocation for at least one of the rendering stages A, B or C which are not yet completed responsive to the prediction circuitry 320 so as to shorten the initial rendering stage time allocation for at least one of the rendering stages A, B or C and thereby shorten the time period for completing at least one of the rendering stages A, B or C by the rendering circuitry 310.

In embodiments of the disclosure in response to a prediction made by the prediction circuitry 320 during the execution of the rendering stage A that the total time period for rendering the given image frame 400 by the rendering circuitry will exceed the associated image frame rendering time allocation TFrame for the given image frame 400, the allocation circuitry 330 can be configured to vary any of the initial rendering stage time allocations TA, TB and TC responsive to the prediction since the rendering stages A, B and C are not yet completed. In some examples, the allocation circuitry 330 can thus be configured to vary the initial rendering stage time allocation TA for the rendering stage A during the rendering of the rendering stage A by the rendering circuitry 310 and before completion of the rendering stage A by the rendering circuitry 310. However, varying the initial rendering stage time allocation TA during the rendering of the rendering stage A is more disruptive for the rendering of the image frame 400 by the rendering circuitry 310 than selecting a rendering stage that has not yet been started and, as discussed below, a random selection from the rendering stages which have not yet been started by the rendering circuitry 310, or the use of a priority rating, may be used so as to preferentially vary an initial rendering stage time allocation for at least one of the rendering stages B and C rather than the rendering stage A.

In the case where the allocation circuitry 330 varies the initial rendering stage time allocation TA for the rendering stage A, this may be achieved by allocating a new rendering stage time allocation TA_new for the rendering stage A for instructing the rendering circuitry 310 to restart the rendering stage A according to the new rendering stage time allocation TA_new. For example, in the case where the rendering stage A is indicated to be 10% complete and 20% of the initial rendering stage time allocation TA has been spent, the allocation circuitry 330 may vary the initial rendering stage time allocation TA responsive to the prediction circuitry 320 by allocating a new rendering stage time allocation TA_new to thereby cause the rendering circuitry 310 to restart the rendering stage A. In this case, the new rendering stage time allocation TA_new is shorter than the initial rendering stage time allocation TA and a point in time at which the rendering stage A is expected to be completed according to the new rendering stage time allocation TA_new is earlier than or the same as a point in time at which rendering stage A would have been expected to be completed according to the initial rendering stage time allocation TA. As discussed below, an image resolution associated with the new rendering stage time allocation TA_new is lower than an image resolution associated with the initial rendering stage time allocation TA to thereby allow the rendering stage A to be completed by the rendering circuitry 310 in a shortened period of time. Additionally, in some examples the rendering operations for the rendering stage A may comprise rendering operations performed for a plurality of light sources, and responsive to the new rendering stage time allocation TA_new the rendering circuitry 310 can be configured to stop performing operations for one or more light sources so as to reduce the number of light sources for which rendering operations are performed and thereby allow completion of the rendering stage A in a shortened period of time. In some cases, rather than allocating a new rendering stage time allocation TA_new, the allocation circuitry 330 may be configured to vary the initial rendering stage time allocation TA by shortening the initial rendering stage time allocation TA so that the remaining processing operations yet to be performed for the rendering stage A are performed according to a lower image resolution to allow the remainder of the rendering stage A to be completed by the rendering circuitry 310 in a shortened period of time. In this way, an initial portion of the rendering stage A may be performed according to a first image resolution and a second portion of the rendering stage A may be performed according to a second image resolution, where the first image resolution is higher than the second image resolution. In addition, in the case where the rendering operations for the rendering stage A comprise rendering operations for a plurality of light sources, responsive to the allocation circuitry 330 varying the initial rendering stage time allocation TA during the rendering of the rendering stage A, the rendering circuitry 310 can be configured to reduce the number of light sources for which rendering operations are performed so that one or more light sources can be culled for the remaining portion of the rendering stage yet to be completed to thereby allow completion of the rendering stage A in a shortened period of time.

In embodiments of the disclosure, the prediction circuitry 320 is configured to predict whether the total time period for rendering the given image frame 400 by the rendering circuitry will exceed the associated image frame rendering time allocation TFrame for the given image frame 400 in dependence upon a detection of whether the rendering of at least one rendering stage of the plural successive rendering stages of the given image frame 400 by the rendering circuitry 310 exceeds the initial rendering stage time allocation for the rendering stage. The prediction circuitry 320 can be configured to generate the prediction for the image frame 400 during the rendering of the image frame 400 by the rendering circuitry 310, by detecting whether at least one of the rendering stages A, B, C for the image frame 400 exceeds or has already exceeded the initial rendering stage time allocation TA, TB, TC, respectively. In the example of FIG. 4b, the prediction circuitry 320 can be configured to detect that the rendering stage A has overrun the initial rendering stage time allocation TA for the rendering stage either at a time corresponding to the end of the initial rendering stage time allocation TA or at a time that the rendering of the rendering stage A is completed by the rendering circuitry 310.

For example, in the case where the rendering circuitry 310 is yet to complete the rendering stage A and the initial rendering stage time allocation TA expires, the prediction circuitry 320 can detect that the rendering stage A has overrun the initial rendering stage time allocation TA and base its prediction that the total time period for rendering the given image frame will exceed TFrame upon such a detection. Therefore, at a time corresponding to a point in time at which the rendering stage A is expected to be completed according to the initial rendering stage time allocation TA (this corresponds to the point in time represented at the end of the time allocation TA in FIG. 4b), the prediction circuitry 320 accordingly predicts that the total time period for rendering the given image frame 400 by the rendering circuitry 310 will exceed the associated image frame rendering time allocation TFrame for the given image frame 400. The prediction circuitry 320 is therefore able to generate the prediction for the image frame 400 prior to the completion of the rendering stage A by the rendering circuitry 310. Alternatively or in addition, the prediction circuitry 320 can detect that the rendering stage A has (already) overrun the initial rendering stage time allocation TA at a time when the rendering of the rendering stage A is completed by the rendering circuitry 310. In this case, in response to the rendering circuitry 310 completing the rendering stage A, the prediction circuitry 310 can be configured to detect whether the rendering of the rendering stage A was completed within the initial rendering stage time allocation TA. In response to detecting that the rendering stage A was not completed within the initial rendering stage time allocation TA, the prediction circuitry 320 predicts that the total time period for rendering the given image frame 400 by the rendering circuitry 310 will exceed the associated image frame rendering time allocation TFrame for the given image frame 400.

In some examples, the prediction circuitry 320 can be configured to generate the prediction for the image frame 400 at the time of expiry of the initial rendering stage time allocation TA, and the prediction circuitry 320 can also be configured to regenerate the prediction for the image frame 400 at the time that the rendering stage A is completed by the rendering circuitry 310 so as to generate two predictions for the image frame in dependence upon the rendering stage A that has overrun. Therefore, the allocation circuitry 330 can vary any of the initial rendering stage time allocations TA, TB and TC responsive to the prediction at the time of expiry of TA and may then, if needed, subsequently vary any of the initial rendering stage time allocations TB and TC again responsive to the prediction at the time of completion of rendering of rendering stage A by the rendering circuitry 310. In this way, a first adjustment of the allocation TB (and/or TC) can be performed at a first time, and if needed, a second adjustment of the allocation TB (and/or TC) can then be performed at a later time, where the second adjustment may allow for a finer (higher granularity) adjustment than the first adjustment. Referring still to FIG. 4b, in response to the prediction circuitry 320 predicting that the total time period for rendering the image frame 400 by the rendering circuitry 310 will exceed the associated image frame rendering time allocation TFrame for the image frame 400, the allocation circuitry 320 is configured to vary the respective rendering stage time allocation for the one or more rendering stages which are not yet completed in respect of the given image frame 400. In embodiments of the disclosure, the allocation circuitry 330 is configured to vary the respective initial rendering stage time allocation for one or more of the rendering stages which are not yet completed in respect of the given image frame by shortening the respective initial rendering stage time allocation for each of the one or more rendering stages which are not yet completed and not yet started. As shown in FIG. 4b, the allocation circuitry 330 varies the initial rendering stage time allocation TB and TC for the rendering stages B and C, respectively, by shortening both TB and TC before the rendering stages B and C are started by the rendering circuitry 310. This provides an example of shortening, responsive to the prediction circuitry 320, the rendering stage time allocation for all of the rendering stages that are yet to be completed and yet to be started so as to shorten the time period for completing the rendering stages B and C. Shortening both TB and TC in this way responsive to the prediction generated in response to the overrun (or expected overrun) of rendering stage A, allows the data processing apparatus 300 to inhibit (or in some examples prevent) the total time period for rendering the given image frame 400 by the rendering circuitry 310 from exceeding the time allocation TFrame associated with the given image 400. In this way, even in the case of one or more rendering stages for a given image frame overrunning their time allocation, the data processing apparatus 300 is able to react accordingly to adjust the time allocations for the later rendering stages for the given image frame 400 to thereby allow completion of the plural successive rendering stages within the image frame rendering time allocation TFrame. Rather than adjusting the initial time allocation for just one of the rendering stages that is not yet completed and not yet started, it is possible to adjust each of the rendering stages that is not yet completed and not yet started. In this way, the impact of the overrun (or expected overrun) of stage A may be distributed across each of the subsequent rendering stages so that a relatively small adjustment is applied to a number of stages rather than a relatively large adjustment being applied to one stage.

Figure 4C:
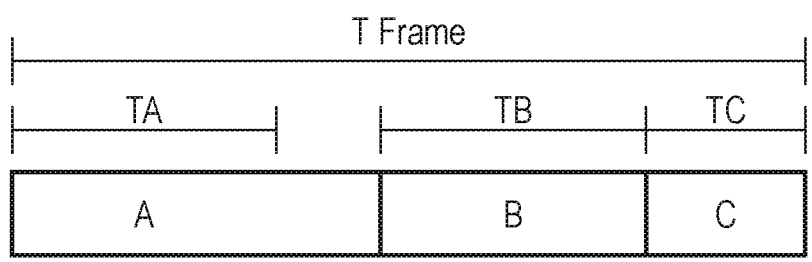
FIG. 4c is another schematic diagram illustrating varying the initial rendering stage time allocation for a selected rendering stage in response to a prediction.
Figure 4D:
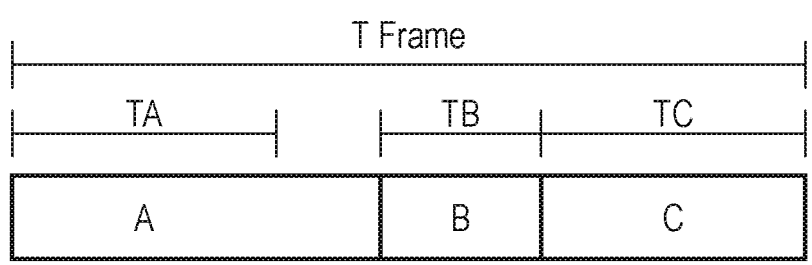
FIG. 4d is another schematic diagram illustrating varying the initial rendering stage time allocation for a selected rendering stage in response to a prediction.

Referring now to FIGS. 4c and 4d, in embodiments of the disclosure the allocation circuitry 330 is configured to select one or more rendering stages from the rendering stages which are not yet completed in respect of the given image frame and to shorten the respective initial rendering stage time allocation for the one or more selected rendering stages. Rather than varying the time allocation for each of the rendering stages not yet completed and not yet started by the rendering circuitry 310, the allocation circuitry 330 can be configured to select one or more of the rendering stages which are not yet completed and to shorten the initial rendering stage time allocation for the selected rendering stages. In embodiments of the disclosure, the allocation circuitry 330 is configured to select one or more rendering stages from the rendering stages which are not yet completed in respect of the given image frame according to a random selection from the one or more rendering stages which are not yet completed and which have not yet started. FIG. 4c provides an example in which the rendering stage C is selected and the initial rendering stage time allocation TC is shortened. FIG. 4d provides an example in which the rendering stage B is selected and the initial rendering stage time allocation TB is shortened. In both examples, the initial rendering stage time allocation is shortened for the selected rendering stage so that the total predicted time period (a sum of TA_Overrun+TB+TC) does not exceed the image frame rendering time allocation TFrame, in order to allow each of the rendering stages to be completed by the rendering circuitry 310 within time allocation for the image frame. Here, TA_Overrun represents either the actual length of time taken by stage A or (if the prediction of overrun is made during execution of the stage A, a prediction of how long the stage A will take). Such a prediction of TA_Overrun can be made in response to one or both of: (a) image or other properties of the data to be rendered, and (b) a proportion of the stage A actually completed by a reference time.

It will be appreciated that whilst FIGS. 4a-4d provide an example of an image frame rendered by the three respective rendering stages A, B and C, the techniques of the present disclosure are applicable to image frames having a plurality of successive rendering stages. In addition, whilst FIGS. 4c and 4d illustrate examples in which one rendering stage is selected, the techniques of the present disclosure can select more than one rendering stage from a plurality of rendering stages yet to be completed by the rendering circuitry 310 so as to shorten more than one rendering stage that is yet to be completed. In examples, the shortening could be applied to a stage currently in progress at the time that the allocation circuitry acts to generate the variation, as discussed previously.

In embodiments of the disclosure, the allocation circuitry 330 is configured to select the one or more rendering stages from the rendering stages which are not yet completed in respect of the given image frame in dependence upon a priority rating. The priority rating defines an order in which the rendering stages which are not yet completed by the rendering circuitry 310 are selected by the allocation circuitry 330. Therefore, in the case where one rendering stage is selected by the allocation circuitry 330 responsive to the prediction circuitry 320, the allocation circuitry can preferentially select the rendering stage indicated as being of lowest priority so that the time allocation is shortened for the rendering stage having the lowest priority among the rendering stages which are yet to be completed. In some examples, the number of respective rendering stages selected by the allocation circuitry 330 responsive to the prediction circuitry 320 may be set in advance for an image frame or may be dependent upon a property associated with the prediction by the prediction circuitry 330. This is discussed in more detail later. In the case where the number of respective rendering stages selected by the allocation circuitry 330 is set in advance to M rendering stages, the allocation circuitry 330 is configured to select the M rendering stages from the multiple rendering stages yet to be completed according to a priority order defined by the priority ratings so that the M (a configurable value of one or more) rendering stages having the lowest priority ratings can be preferentially selected for shortening. In this way, rendering stages which are or greater importance for the image frame can be associated with a higher priority rating (indicating a priority preference not to alter the time allocation to those stages) and therefore selection and shortening of these rendering stages by the allocation circuitry 330 can be inhibited.

In embodiments of the disclosure, the priority rating is dependent upon whether the rendering stage is not yet started in respect of the given image frame. As discussed previously, the prediction circuitry 320 is configured to generate the prediction for the image frame at any time during the rendering of the image frame by the rendering circuitry 310, and as such a prediction may be generated after a rendering stage has started and before the rendering stage has completed. Therefore, the selection performed by the allocation circuitry 330 may similarly be performed at any time during the rendering of the image frame by the rendering circuitry 310. A first priority rating may be associated with a rendering stage that has started and is not yet completed by the rendering circuitry 310, and a second priority rating may be associated with one or more other rendering stages that have not yet been started by the rendering circuitry 310, the first priority rating being different from the second priority rating. In some examples, a weighting may be applied to a priority rating for a rendering stage depending on whether the rendering stage is currently being executed by the rendering circuitry 310, so that a rendering stage that is already in progress and not yet completed has a weighted priority rating which thereby distinguishes a rendering stage that has not yet been completed and has already been started from a rendering stage that has not yet been started. In this way, the priority rating can be used to distinguish between a rendering stage that has been started and one or more rendering stages which are not yet started, and selection by the allocation circuitry 330 of an already started and not yet completed rendering stage can be inhibited. In particular, selecting an already started and not yet completed rendering stage so as to shorten its time allocation is more disruptive for the rendering of the image frame by the rendering circuitry 310 than selecting a rendering stage that has not yet been started. The priority rating may for example take the form of a first indicator for indicating an already started and not yet completed rendering stage and a second indicator for indicating all other rendering stages that are yet to be completed.

In embodiments of the disclosure, the priority rating is dependent upon a type of rendering operation associated with each of the rendering stages. As discussed previously, each of the rendering stages of the plural successive rendering stages is performed so as to obtain a different rendering effect for the rendered image frame, and as such each rendering stage is associated with a different type of rendering operation. Types of rendering operation may for example include: environment map operations; shadow map operations; opaque geometry operations; transparent geometry operations; deferred lighting operations; depth-of-field operations; anti-aliasing operations; ambient occlusion operations; and scaling operations among others. A priority rating is associated with each type of rendering operation, and in this way the priority rating can be used to distinguish between the respective successive rendering stages for an image frame. A lower priority rating can be associated with a type of rendering operation which is of lower importance for the image frame, whereas a higher priority rating can be associated with a type of rendering operation which is of higher importance for the image frame. The priority rating may be used to define an order of importance for the different types of rendering operations, so that the priority rating defines an order in which the rendering stages which are not yet completed by the rendering circuitry 310 are selected by the allocation circuitry 330.

For example, a rendering stage corresponding to an anti-aliasing operation may be associated with a first priority rating and a rendering stage corresponding to a shadow map operation may be associated with a second priority rating, wherein the first priority rating is different from the second priority rating. In some examples, a shadow map operation is perceived to be of lesser importance for an image frame than an anti-aliasing operation, and as such the first priority rating associated with the anti-aliasing operation has a higher priority than the second priority rating associated with the shadow map operation. Consequently, in response to the prediction by the prediction circuitry 330, the allocation circuitry 330 will preferentially select the rendering stage corresponding to the shadow map operation instead of the rendering stage corresponding to the anti-aliasing operation so that the timing allocation for the stage of rendering the shadow map can be shortened instead of the stage for anti-aliasing.

In embodiments of the disclosure, the allocation circuitry 330 is configured to vary a respective initial rendering stage time allocation for a rendering stage which has not yet completed in dependence upon a difference between a total time period predicted by the prediction circuitry for rendering the given image and the associated image frame rendering time allocation for the given image frame. The allocation circuitry 330 is configured to vary the respective initial rendering stage time allocation for one or more rendering stages which are not yet completed by the rendering circuitry 310, so as to shorten a total amount of time allocated for the one or more rendering stages which are not yet completed. In the example shown in FIG. 4b, the initial rendering stage time allocation is shortened for both the rendering stage B and the rendering stage C, so that both stages B and C can be completed within the image frame rendering time allocation TFrame. In FIG. 4b, this is achieved by varying TB and TC by the same amount. In the examples shown in FIGS. 4c and 4d, the initial rendering stage time allocation is shortened for one of the rendering stages B and C, so that both stages B and C can be completed within the image frame rendering time allocation TFrame. Therefore, the amount by which the initial rendering stage time allocation is varied for a given rendering stage that is not yet completed is dependent upon: the extent to which the total time period for rendering the given image frame is predicted to overrun the image frame rendering time allocation TFrame; and the number of given rendering stages for which the initial rendering stage time allocation is to be varied.

Therefore, for the example shown in FIG. 4b, the calculation TFrame−TA_Overrun=TB+TC is used by the allocation circuitry 330, where as discussed previously the value of TA_Overrun is a value that is obtained from the prediction during, or at the time of completion of, the rendering by the rendering circuitry 310 of the rendering stage A (in this example TA_Overrun represents the extent to which the total time period for rendering the given image frame is predicted to overrun the image frame rendering time allocation TFrame). Since the initial rendering stage time allocation is shortened for both the rendering stages in FIG. 4b by the same amount and the initial rendering stage time allocation is the same for both the rendering stages in this example, the value of TB and TC is given by TB=TC=(TFrame−TA_Overrun)×0.5. For the example shown in FIG. 4c, the calculation TFrame−TA_Overrun−TB=TC is used by the allocation circuitry 330, since only the value TC is to be varied. Similarly, for the example shown in FIG. 4d, the calculation TFrame−TA_Overrun−TC=TB is used by the allocation circuitry 330, since only the value TB is to be varied.

As an alternative to the above calculation, for the examples shown in FIGS. 4b-4d, a plurality of initial rendering stage time allocations may be set in advance for each rendering stage of the plural successive rendering stages for the given image frame 400, with the exception that a single initial rendering stage time allocation TA is set in advance for the first rendering stage A that is to be performed first. In this case, a plurality of initial rendering stage time allocations TB, TB_1 . . . TB_N can be set in advance for the rendering stage B and a plurality of rendering stage time allocations TC, TC_1 . . . TC_N can be set in advance for the rendering stage C. The initial rendering stage time allocation TB represents the time allocation with the longest time period and the initial rendering stage time allocation TB_N represents the time allocation with the shortest time period. As such, for the rendering stage B there may be at least a first initial rendering stage time allocation TB and a second initial rendering stage time allocation TB_1. Similarly, for the rendering stage C there may be at least a first initial rendering stage time allocation TC and a second initial rendering stage time allocation TC_1. A first initial rendering stage time allocation is associated with a first mode of rendering for a given rendering stage having a corresponding first image resolution and a second initial stage time allocation is associated with a second mode of rendering for the given rendering stage having a corresponding second image resolution, the second image resolution being lower than the first image resolution. In this way, responsive to the prediction circuitry 320 the allocation circuitry 330 can vary the first initial rendering stage time allocation for the rendering stage B and/or the rendering stage C by allocating the second initial stage time allocation for the rendering stage to replace the first initial stage time allocation so as to shorten the time allocation for the rendering stage. In a simplest case, just the first initial rendering stage time allocation and the second initial rendering stage time allocation may be set in advance for a rendering stage so that the second initial rendering stage time allocation is used in response to a prediction that the given image frame 400 will overrun the image frame rendering time allocation TFrame for the given image frame 400. In other cases where there are more than two initial rendering stage time allocations set for a rendering stage, the value TA_Overrun may be compared with a threshold condition so as to appropriately select one of the initial rendering stage time allocations.

As discussed previously, the allocation circuitry 330 may vary a respective initial rendering stage time allocation by allocating another rendering stage time allocation responsive to the prediction circuitry 320 to adjust (modify) the initial rendering stage time allocation set in advance. Therefore, responsive to the prediction circuitry 320 the allocation circuitry 330 may vary the respective initial rendering stage time allocation for the rendering stage B and/or the rendering stage C by varying the first initial rendering stage time allocation by an amount dependent upon the second initial rendering stage time allocation. For example, the first initial rendering stage time allocation TB may have a value of 5 milliseconds, and the second initial rendering stage time allocation TB_1, rather than representing a shorter time period (e.g. 4 milliseconds) for performing the rendering stage, may be configured as a time period by which the first initial rendering stage time allocation TB is to be modified to be shortened (e.g. 1 millisecond). For cases where there are more than two initial rendering stage time allocations set for a rendering stage, the value TA_Overrun may be compared with a threshold condition so as to appropriately select one of the initial rendering stage time allocations for modifying the first initial rendering stage time allocation.

Consequently, rather than selecting one or more rendering stages from the rendering stages which are not yet completed in respect of the given image frame 400 according to the priority rating, the allocation circuitry 330 can be configured to select a given rendering stage from the rendering stages which are not yet completed in dependence upon the plurality of initial rendering stage time allocations associated with the given rendering stage and an amount of time by which the total time period for rendering the given image frame 400 is predicted to overrun the image frame rendering time allocation TFrame. In this way, in response to a prediction that the given image frame 400 will overrun the image frame rendering time allocation TFrame, the allocation circuitry 330 can select a given rendering stage for which one of the plurality of rendering stage time allocations has an associated time period that shortens the timing allocation for the given rendering stage to an extent that resolves the predicted overrun for the given image frame 400, and vary the first initial rendering stage time for the selected given rendering stage according to the one of the plurality of rendering stage time allocations. For example, in response to a prediction that the given image frame 400 will overrun the image frame rendering time allocation by 2 milliseconds, if one of the plurality of rendering stage time allocations (TB_1 . . . TB_N) for the rendering stage B corresponds to a shortening of the time allocation for the rendering stage B by 2 milliseconds or more, then the allocation circuitry 320 can select the rendering stage B and vary the first initial rendering stage time TB using the one of the plurality of initial rendering stage time allocations to thereby shorten the rendering stage B and inhibit the overrun of the given image frame 400.

As discussed previously, the number of respective rendering stages selected by the allocation circuitry 330 responsive to the prediction circuitry 320 may be set in advance for an image frame or may be dependent upon a property associated with the prediction by the prediction circuitry 330. For example, the number of respective rendering stages to be selected by the allocation circuitry 330 responsive to the prediction circuitry 320 may be set to one. Therefore, in response to a prediction by the prediction circuitry 320 that the total time period for rendering the image frame 400 will exceed the allocation TFrame, the allocation circuitry 330 will select one rendering stage and the initial time allocation for the selected rendering stage is adjusted by an amount that is dependent upon a predicted amount of time by which the total time period for rendering the given image frame will overrun the image frame rendering time allocation TFrame. In particular, the initial time allocation for the selected rendering stage may be adjusted by an amount that is substantially equal to the predicted amount of time by which the total time period for rendering the given image frame will overrun the image frame rendering time allocation TFrame. Alternatively, the initial time allocation for the selected rendering stage may be adjusted by an amount that is greater than the predicted amount of time by which the total time period for rendering the given image frame will overrun the image frame rendering time allocation TFrame so that the plural successive rendering stages are then predicted to be completed in a period of time that is in fact shorter than the image frame rendering time allocation TFrame. In this way, the initial time allocation for the selected rendering stage may be adjusted to an extent to allow for a margin of error for the prediction.

In some examples, the number of respective rendering stages selected by the allocation circuitry 330 responsive to the prediction circuitry 320 may be dependent upon a predicted amount of time by which the total time period for rendering the given image frame is predicted to overrun the image frame rendering time allocation TFrame. The predicted amount of time by which the total time period for rendering the given image frame is predicted to overrun the image frame rendering time allocation TFrame can be compared, by the allocation circuitry 330, with a threshold condition to determine a number of rendering stages to be selected responsive to the prediction circuitry 330. The threshold condition comprises one or more threshold values for comparison with the predicted amount of time from the prediction circuitry 320. In a simplest case, the allocation circuitry 330 is configured to compare a first threshold value with the predicted amount of time from the prediction circuitry 320, and to determine the number of respective stages to be selected in dependence upon whether the predicted amount of time is greater than the first threshold value. For example, the first threshold value may be 1 millisecond, and when the predicted amount of time is less than or equal to the first threshold value the number of respective stages to be selected is one, whereas when the predicted amount of time is greater than the first threshold value the number of respective stages to be selected is two. In other examples, the threshold condition comprises the first threshold value and a second threshold value, wherein when the predicted amount of time is less than or equal to the second threshold value the number of respective stages to be selected is two, and when the predicted amount of time is greater than the second threshold value the number of respective stages to be selected is three. It will be appreciated that the threshold condition may be applied using any number of threshold values for determining a number of rendering stages which are to be selected responsive to the prediction circuitry 320.

Figure 5:
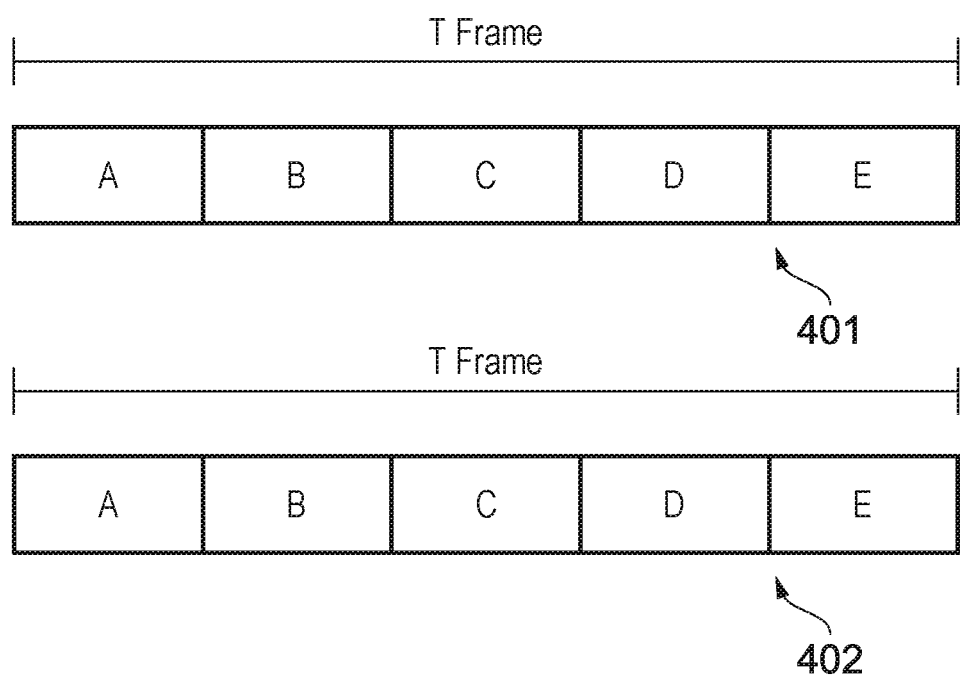
FIG. 5 is another schematic diagram illustrating selecting one or more rendering stages in respect of a next image frame.

In embodiments of the disclosure the allocation circuitry 330 is configured to select one or more rendering stages in respect of a next image frame responsive to the prediction circuitry 320 and to vary the respective initial rendering stage time allocation for the one or more selected rendering stages in respect of the next image frame so as to shorten a total time period for rendering the next image frame by the rendering circuitry 310. Referring now to FIG. 5, a given image frame 401 having the plural rendering stages A, B, C, D and E is shown where time is again represented in the horizontal axis and progresses from left to right as drawn. A next image frame 402 which is subsequent (for example, immediately subsequently rendered) to the given image frame 401 in a sequence of image frames is also shown, where the next image frame 402 also has the plural rendering stages A, B, C, D and E. The letters A, B, C, D and E are used here to denote a type of rendering operation for a rendering stage, such that the rendering stage A in the given image frame 401 and the rendering stage A in the next image frame 402 have the same type of rendering operation. Similarly, the rendering stage B in the given image frame 401 and the rendering stage B in the next image frame 402 also have the same type of rendering operation, and so on for C, D and E. In response to a prediction by the prediction circuitry 320 that the total time period for rendering the given image frame 401 by the rendering circuitry 310 will exceed the associated image frame rendering time allocation TFrame for the given image frame 401, the allocation circuitry 320 can select one or more rendering stages A-E in the next image frame 402 and vary the respective initial rendering stage time allocation for the one or more selected rendering stages to shorten the total time period for rendering the next image frame 402 by the rendering circuitry 310. In some examples, the priority rating as described above may similarly be used by the allocation circuitry 330 in respect of the next image frame so as to define an order of priority in which the rendering stages in the next image frame 402 are selected (for shortening) by the allocation circuitry 330.

In embodiments of the disclosure, in response to a prediction that the rendering of a given rendering stage of the plural successive rendering stages of the given image frame 401 by the rendering circuitry 310 will exceed the initial rendering stage time allocation for the given rendering stage, the allocation circuitry 320 is configured to select a rendering stage in respect of the next image frame 402 having a same type of rendering operation as the given rendering stage. As discussed above, the prediction circuitry 320 can be configured to predict whether the total time period for rendering the given image frame 401 by the rendering circuitry 310 will exceed the associated image frame rendering time allocation TFrame for the given image frame 401 in dependence upon a prediction of whether the rendering of at least one rendering stage of the plural successive rendering stages of the given image frame 401 by the rendering circuitry 310 will exceed the initial rendering stage time allocation for the rendering stage. In response to a prediction that the rendering of the rendering stage C, for example, in the given image frame 401 will overrun the initial rendering stage time allocation, the allocation circuitry 320 varies the initial rendering stage time allocation for at least one of the rendering stages A and B in respect of the given image frame 401. Optionally, the allocation circuitry 320 may also vary the initial rendering stage time allocation for the rendering stage C in respect of the next image frame 402. Therefore, the timing constraint problems encountered in the given image frame 401, which arise due to the overrun of the rendering stage C in the given image frame 401, can be addressed for the given image frame 401 by varying the initial rendering stage time allocation for at least one of the rendering stages A and B, and rather than encountering the same problems again for the next image frame 402, the initial rendering stage time allocation for the rendering stage C in the next image frame 402 is varied to shorten the rendering stage time allocation for the rendering stage C. In this way, the rendering of the rendering stage C by the rendering circuitry 310 is less likely to overrun for the next image frame 402 and eat into the timing allocations of the other rendering stages in the next image frame 402. Therefore, the rendering stage time allocation for the rendering stage C in respect of the next image frame 402 is shortened, and is thus rendered by the rendering circuitry 310 with a reduced render resolution compared to the rendering stage C in respect of the given image frame 401 so as to allow a shorter completion time for the rendering stage C.

In embodiments of the disclosure, an image resolution for each rendering stage is dependent upon the respective rendering stage time allocation. As discussed above, each plural successive rendering stage has a respective initial rendering stage time allocation. The initial rendering stage time allocation represents a time period initially set or allocated for a rendering stage within which the rendering operations for the stage are to be completed by the rendering circuitry 310. For a given rendering a stage having an initial rendering stage time allocation (e.g. 5 milliseconds), the rendering circuitry 310 is configured to render the given rendering stage with a first render resolution in dependence upon the first rendering stage time allocation. In the case where the initial rendering stage time allocation is shortened by the allocation circuitry 330 responsive to the prediction circuitry 320 so as to obtain a modified rendering stage time allocation (e.g. 3 milliseconds) for the given rendering stage, the rendering circuitry 310 is configured to render the given rendering stage with a second render resolution in dependence upon the modified rendering stage time allocation, where the second render resolution is a lower render resolution than the first render resolution. Therefore, the render resolution associated with the rendering by the rendering circuitry 310 of a given rendering stage is dependent upon the rendering time allocation for the rendering stage. In response to predicting that the total time period for rendering the given image frame will overrun the image frame rendering time allocation TFrame, the allocation circuitry 330 varies the respective initial rendering stage time allocation for one or more of the rendering stages which are not yet completed, and the rendering circuitry 310 performs the rendering of the one or more of the rendering stages which are not yet completed according to a render resolution that is dependent upon the modified rendering stage time allocation. In this way, responsive to one or more of the rendering stages overrunning the initial rendering stage time allocation, the initial rendering stage time allocation for one or more rendering stages not yet completed can be adjusted to perform the rendering operations at a lower render resolution while still completing the plural successive rendering stages for the image frame within the time allocation TFrame. In addition, in some examples the rendering operations for a rendering stage may be performed using a plurality of light sources to render the scene in the image frame. Responsive to one or more of the rendering stages overrunning the initial rendering stage time allocation, the initial rendering stage time allocation for one or more rendering stages not yet completed can be adjusted and the number of light sources used for the rendering operations can be reduced.

Figure 6:
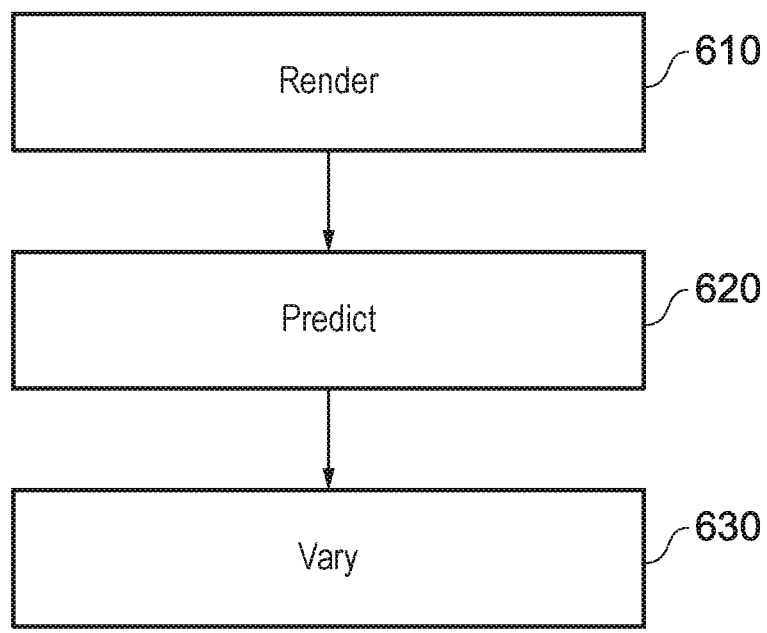
FIG. 6 is a schematic flowchart illustrating a data processing method.

Referring now to FIG. 6, in embodiments of the disclosure a data processing method comprises:

rendering (at a step 610) an image frame by plural successive rendering stages, each rendering stage having a respective initial rendering stage time allocation;

predicting (at a step 620), in dependence upon rendering of at least one rendering stage of the plural successive rendering stages of a given image frame, whether a total time period for rendering the given image frame will exceed an associated image frame rendering time allocation for the given image frame; and varying (at a step 630) the respective initial rendering stage time allocation for one or more rendering stages which are not yet completed in respect of the given image frame responsive to the prediction, so as to shorten the total time period for rendering the given image frame.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus, comprising:
rendering circuitry to render an entire image frame by way of a plurality of successive rendering stages, each rendering stage having a respective initial rendering stage time allocation, where each rendering stage is performed on a respective set of data so as to obtain a different rendering effect for the entire image frame;
prediction circuitry to predict, in dependence upon a status of at least one rendering stage of the plural successive rendering stages, whether a total time period for rendering the entire image frame by the rendering circuitry will exceed a predetermined image frame rendering time allocation for the entire image frame; and
allocation circuitry to vary the respective initial rendering stage time allocation for one or more of the plurality of successive rendering stages, which have not yet completed rendering the respective set of data thereof, responsive to the prediction circuitry, so as to shorten the total time period for rendering the entire image frame by the rendering circuitry.

2. The data processing apparatus of claim 1, in which the allocation circuitry is configured to vary the respective initial rendering stage time allocation for one or more of the plurality of successive rendering stages which have not yet completed rendering the respective set of data thereof, by shortening the respective initial rendering stage time allocation for each of the one or more of the plurality of successive rendering stages.

3. The data processing apparatus of claim 1, in which the allocation circuitry is configured to select one or more rendering stages from the one or more of the plurality of successive rendering stages which have not yet completed rendering the respective set of data thereof, and to shorten the respective initial rendering stage time allocation for the one or more selected rendering stages.

4. The data processing apparatus of claim 3, in which the allocation circuitry is configured to select one or more rendering stages from the one or more of the plurality of successive rendering stages which have not yet completed rendering the respective set of data thereof, according to a random selection from among the one or more of the plurality of successive rendering stages.

5. The data processing apparatus of claim 3, in which the allocation circuitry is configured to select the one or more rendering stages from the one or more of the plurality of successive rendering stages which have not yet completed rendering the respective set of data thereof in dependence upon a priority rating.

6. The data processing apparatus of claim 5, in which the priority rating is dependent upon whether a given rendering stage among the one or more of the plurality of successive rendering stages has not yet started rendering the respective set of data thereof.

7. The data processing apparatus of claim 5, in which the priority rating is dependent upon a type of rendering operation associated with each of the plurality of successive rendering stages.

8. The data processing apparatus of claim 1, in which the prediction circuitry is configured to predict whether the total time period for rendering the entire image frame by the rendering circuitry will exceed the predetermined image frame rendering time allocation for the entire image frame in dependence upon a prediction of whether the rendering of at least one rendering stage of the plural successive rendering stages will exceed the respective initial rendering stage time allocation for the at least one rendering stage.

9. The data processing apparatus of claim 1, in which the prediction circuitry is configured to predict whether the total time period for rendering the entire image frame by the rendering circuitry will exceed the predetermined image frame rendering time allocation for the entire image frame in dependence upon a detection of whether the rendering of at least one rendering stage of the plural successive rendering stages exceeds the respective initial rendering stage time allocation for the at least one rendering stage.

10. The data processing apparatus of claim 1, in which the allocation circuitry is configured to vary the respective initial rendering stage time allocation for a given rendering stage among the one or more of the plurality of successive rendering stages that has not completed rendering the respective set of data thereof in dependence upon a difference between a total time period predicted by the prediction circuitry for rendering the entire image and the image frame rendering time allocation for the given rendering stage.

11. The data processing apparatus of claim 1, in which the allocation circuitry is configured to select one or more rendering stages in respect of a next image frame responsive to the prediction circuitry and to vary the respective initial rendering stage time allocation for the one or more selected rendering stages in respect of the next image frame so as to shorten a total time period for rendering the next image frame by the rendering circuitry.

12. The data processing apparatus of claim 11, in which in response to a prediction that the rendering of a given rendering stage of the plural successive rendering stages of the given image frame by the rendering circuitry will exceed the initial rendering stage time allocation for the given rendering stage, the allocation circuitry is configured to select a rendering stage in respect of the next image frame having a same type of rendering operation as the given rendering stage.

13. The data processing apparatus of claim 1, in which the respective initial rendering stage time allocation is set in advance for each of the plurality of successive rendering stages in dependence upon a respective type of rendering operation associated with each of the plurality of successive rendering stages.

14. The data processing apparatus of claim 1, in which the allocation circuitry is configured to allocate, prior to rendering of the entire image frame by the rendering circuitry, the respective initial rendering stage time allocation for each rendering stage in dependence upon at least a respective type of rendering operation associated with each of the plurality of successive rendering stages.

15. The data processing apparatus of claim 14, in which the allocation circuitry is configured to vary the respective initial rendering stage time allocation for the one or more rendering stages which have not yet completed rendering the respective set of data thereof by allocating to each of the one or more rendering stages another respective rendering stage time allocation responsive to the prediction circuitry, the another respective rendering stage time allocation being different from the respective initial rendering stage time allocation previously allocated to that rendering stage for the given image frame by the allocation circuitry.

16. The data processing apparatus of claim 1, in which an image resolution for each rendering stage is dependent upon the respective rendering stage time allocation.

17. The data processing apparatus of claim 1, in which the rendering circuitry comprises at least one of a graphics processing unit and a central processing unit.

18. A data processing method, comprising:
   rendering an entire image frame by way of a plurality of successive rendering stages, each rendering stage having a respective initial rendering stage time allocation, where each rendering stage is performed on a respective set of data so as to obtain a different rendering effect for the entire image frame;
   predicting, in dependence upon a status of at least one rendering stage of the plural successive rendering stages, whether a total time period for rendering the entire image frame by the rendering circuitry will exceed a predetermined image frame rendering time allocation for the entire image frame; and
   varying the respective initial rendering stage time allocation for one or more of the plurality of successive rendering stages which have not yet completed rendering the respective set of data thereof, responsive to the prediction circuitry, so as to shorten the total time period for rendering the entire image frame by the rendering circuitry.

19. A machine-readable, non-transitory storage medium which stores computer software which, when executed by a computer, causes the computer to perform a data processing method, comprising:
   rendering an entire image frame by way of a plurality of successive rendering stages, each rendering stage having a respective initial rendering stage time allocation, where each rendering stage is performed on a respective set of data so as to obtain a different rendering effect for the entire image frame;
   predicting, in dependence upon a status of at least one rendering stage of the plural successive rendering stages, whether a total time period for rendering the entire image frame by the rendering circuitry will exceed a predetermined image frame rendering time allocation for the entire image frame; and
   varying the respective initial rendering stage time allocation for one or more of the plurality of successive rendering stages, which have not yet completed rendering the respective set of data thereof, responsive to the prediction circuitry, so as to shorten the total time period for rendering the entire image frame by the rendering circuitry.

* * * * *